(12) United States Patent
Kagi

(10) Patent No.: US 6,538,803 B1
(45) Date of Patent: Mar. 25, 2003

(54) OPTICAL AMPLIFIER AND OPTICAL WAVELENGTH DIVISION MULTIPLEXING COMMUNICATION SYSTEM

(75) Inventor: Nobuyuki Kagi, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 09/831,473

(22) PCT Filed: Sep. 11, 2000

(86) PCT No.: PCT/JP00/06184

§ 371 (c)(1),
(2), (4) Date: Sep. 27, 2001

(87) PCT Pub. No.: WO01/20821

PCT Pub. Date: Mar. 22, 2001

(30) Foreign Application Priority Data

Sep. 10, 1999 (JP) ............................................. 11-256438

(51) Int. Cl.$^7$ ............................. H04B 10/17; H01S 3/10
(52) U.S. Cl. ............. 359/337.12; 359/124; 359/341.41; 359/341.42
(58) Field of Search ................................ 359/124, 177, 359/337.12, 341.41, 341.42

(56) References Cited

U.S. PATENT DOCUMENTS

| | | | | |
|---|---|---|---|---|
| 5,805,322 A | * | 9/1998 | Tomofuji | 357/177 |
| 6,366,393 B1 | * | 4/2002 | Feulner et al. | 359/337 |
| 6,424,456 B1 | * | 7/2002 | Lee et al. | 359/337 |
| 6,433,904 B1 | * | 8/2002 | Swanson et al. | 359/133 |
| 6,473,212 B1 | * | 10/2002 | Chraplyvy et al. | 359/124 |

FOREIGN PATENT DOCUMENTS

| | | | |
|---|---|---|---|
| EP | 1130823 A1 | * | 3/2001 |
| JP | 0621897 | | 1/1994 |
| JP | 9244080 | | 9/1997 |
| JP | 9289503 | | 11/1997 |
| JP | 10112686 | | 4/1998 |
| JP | 10229386 | | 8/1998 |
| JP | 11177532 | | 7/1999 |
| JP | 2001086071 A | * | 3/2001 |

OTHER PUBLICATIONS

International Search Report from Application PCT/JP00/06184.

* cited by examiner

Primary Examiner—Nelson Moskowitz
(74) Attorney, Agent, or Firm—Knobbe, Martens, Olson & Bear, LLP

(57) ABSTRACT

The present invention provides a wavelength division multiplex light communication system using an optical amplifier which can amplifying and translating a multiplex light signal obtained by wavelength division multiplexing a plurality of channel light signals and can perform its control such that when the number of channels n is the maximum number of channels $n_{max}$, the total light output power $P_t$ is maximum, $P_{max}$ and such that when the number of channels n for light signals is smaller than $n_{max}$, the total light output power $P_t$ obtained by amplifying said multiplex light signal is substantially $P_t > P_{max} \times n/n_{max}$.

5 Claims, 10 Drawing Sheets

Fig.10

OPTICAL AMPLIFIER AND OPTICAL WAVELENGTH DIVISION MULTIPLEXING COMMUNICATION SYSTEM

BACKGROUND OF THE INVENTION

The present invention relates to an optical amplifier and wavelength division multiplex light communication system.

Figure 9:
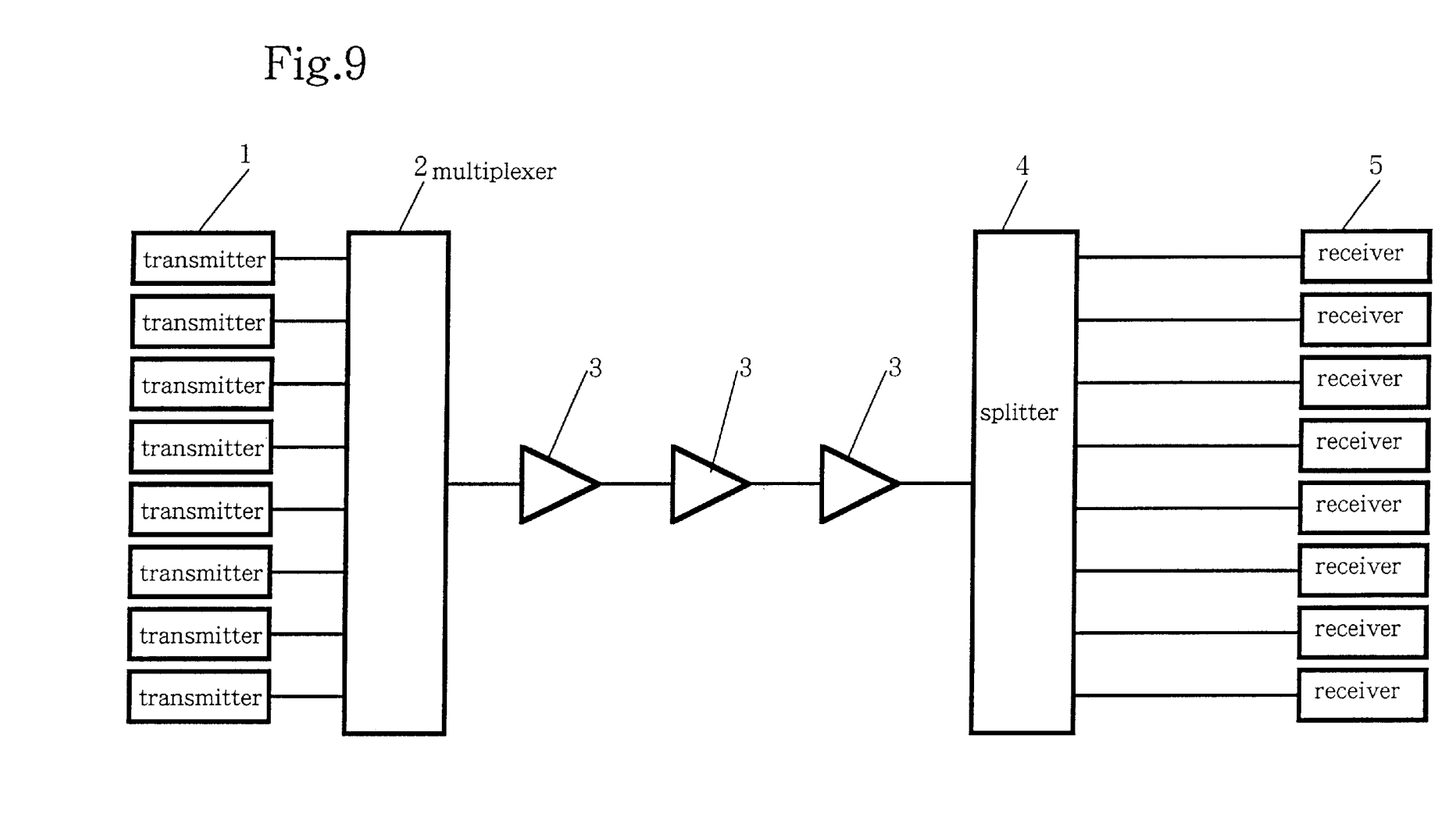
FIG. 9 shows a wavelength division multiplex light communication system according to the prior art.
Figure 10:
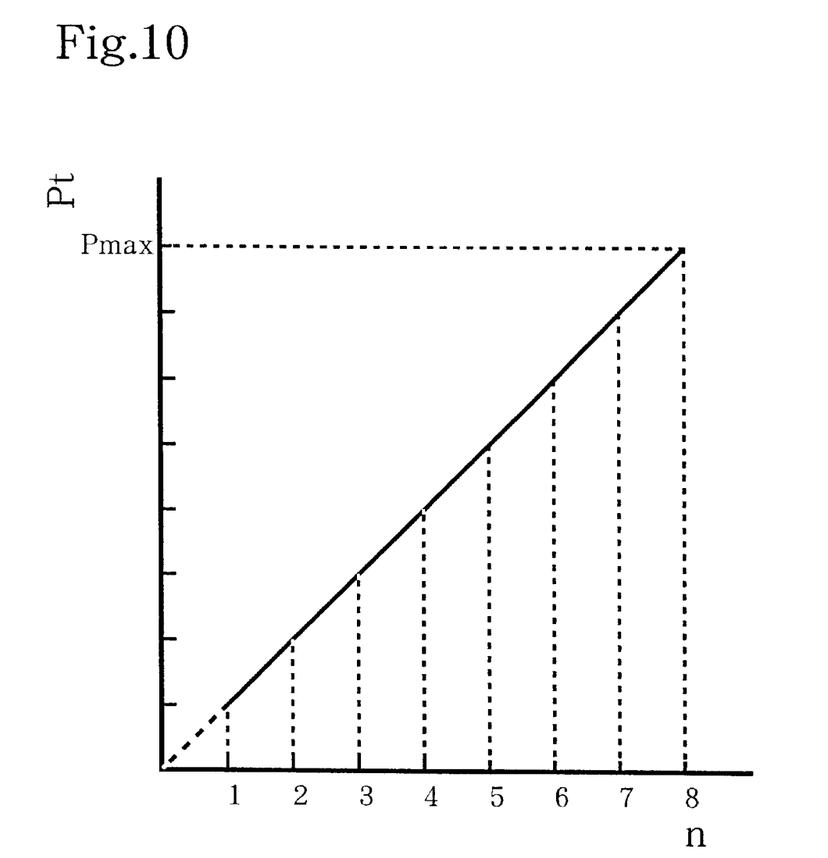
FIG. 10 is a graph schematically illustrating the relationship between the-number of channels and the total light output power in an optical amplifier used with the wavelength division multiplex light communication system of the prior art.

FIG. 9 illustrates a wavelength division multiplex light communication system according to the prior art while FIG. 10 is a graph schematically showing the relationship between the number of channels in an optical amplifier used in the wavelength division multiplex light communication system of the prior art and the total light output power.

As shown in FIG. 9, the wavelength division multiplex light communication system of the prior art comprises a plurality (eight in this figure) of light transmitters 1 for transmitting light signals, a multiplexer 2 for wavelength division multiplexing a plurality of channel light signals transmitted from the light transmitters 1, a plurality of optical amplifiers 3 connected in series with one another for amplifying and translating the multiplex light signals wave division multiplexed by the multiplexer 2, a splitter 4 for wavelength separating the amplified light signals from the optical amplifiers 3 for each channel and a plurality of light receivers 5 each for receiving each light signal wavelength separated by the splitter 4.

In general, the optical amplifier used in the wavelength division multiplex light communication system is adapted to increase or decrease the total light output power depending on the number of channels.

SUMMARY OF THE INVENTION

The present invention provides an optical amplifier characterized by that the control is performed such that the total light output power Pt becomes equal to the maximum total light output power $P_{max}$ when the number of channels (n) is maximum ($n_{max}$) and also such that the total light output power $P_t$ obtained by amplifying multiplex light signals substantially becomes $$P_t > P_{max} \times n/n_{max}$$

when the number of light signal channels n is smaller than $n_{max}$.

BRIEF DESCRIPTION OF THE DRAWINGS

FIG. 2(a) is a graph illustrating the relationship between the number of channels and the total light output power in the first optical amplifier according to the embodiment of the present invention while FIG. 2(b) is a diagram illustrating the I-L (incoming current-output level) characteristics of the pump light source.

FIG. 7(A) being a graph illustrating the span loss-Q value characteristics in the prior art optical amplifier for two-wave (two-channel) and eight-wave (eight-channel) transmissions and FIG. 7(B) being a graph illustrating the span loss-Q value characteristics in the optical amplifier of this embodiment for two-wave and eight-wave transmissions.

FIG. 8(A) being a graph illustrating span loss-BER characteristics in the prior art optical amplifier for two-wave and eight-wave transmissions and FIG. 8(B) being a graph illustrating span loss-BER characteristics in the optical amplifier of this embodiment for two-wave and eight-wave transmissions.

DETAILED DESCRIPTION

The embodiments of the present invention will now be described in comparison with the prior art by way of example with reference to the drawings.

In the prior art, the optical amplifier normally increased the total light output power Pt proportional to the number of channels (n), as shown in FIG. 10. This is mainly for two following reasons.

(1) In order to ensure a good signal-to-noise (S/N) ratio, it is required that an optical amplifier in any subsequent stage receives a sufficiently high light output power for each channel. Therefore, the light output power for each channel must exceed a predetermined acceptable minimum level.

(2) The light output power for each channel should not exceed a predetermined acceptable maximum level so that any non-linear effect such as stimulated brillouin scattering (SBS) will not occur in the optical fiber.

However, the optical amplifier of the prior art cannot necessarily satisfy the above requirement (1) if the total light output power causes to be increased proportional to the number of channels. The reason will be described in detail.

The total light output power ($P_t$) in the optical amplifier is represented by the sum of light output powers ($P_j$: j being channel number) for every channel plus the light output power ($P_{ASE}$) of a spontaneously emitted light (ASE light) occurred in the optical amplifier:

$$Pt = \Sigma Pj + P_{ASE}.$$

If the gain is the same throughout the optical amplifiers, the magnitude of $P_{ASE}$ is substantially invariable. Consequently, the light output power for each channel is smaller as the number of channel is smaller. The contribution of $P_{ASE}$ relative to Pt is correspondingly increased. For such a reason, the wavelength division multiplex light communication system comprising a plurality of optical amplifiers connected in series with one another will provide a considerably large contribution of $P_{ASE}$ in comparison with $P_j$. Since the fraction of light output power taken by $P_{ASE}$ becomes larger as the number of channels is smaller as long as the total light output power $P_t$ is proportional to the number of channels (n), the light output power $P_j$ for each channel will become smaller. As a result, $P_j > P_{min}$ (acceptable minimum value) may not be satisfied when the number of channels is smaller, rather than when the number of channels is larger.

Rather than the larger number of channels, the smaller number of channels did not provide a good transmission since the system was more greatly influenced by the ASE light with the total light output power being more easily variable to degrade S/N ratio and others.

Moreover, the optical amplifier of the prior art controls the total light output power depending on increase or decrease of the number of channels. If the number of channels is increasing, however, the control of the optical amplifier cannot follow such a condition. This temporarily makes the gain in the existing channels insufficient, so that a good S/N ratio cannot be ensured. The reason will be described in detail.

For example, if the number of channels increases from n to n+1 and when the optical amplifier recognizes the increase of the number of channels from information from any monitoring system, the optical amplifier increases its total light output power from $P_n$ to $P_{n+1}$.

Normally, there is a delay time ranging between several msec and several ten msec until the total light output power increases after the number of channels has increased. During this, the output of the optical amplifier will remain at the value of $P_n$ regardless of the number of channels becoming n+1.

This may occur such a situation that the light output power for each channel does not exceed the predetermined acceptable minimum level and may thus occur the temporal degradation of S/N ratio such as bit error the like. Such a situation is most serious occurs as the number of channels increases from 1 to 2. In this case, there may temporarily occur such a situation that the light output power becomes half or $P_0$ in the transient condition in which the number of channels is increasing, regardless of the total light output power of $2 \times P_0$ in the stationary two-channel state.

Figure 2:
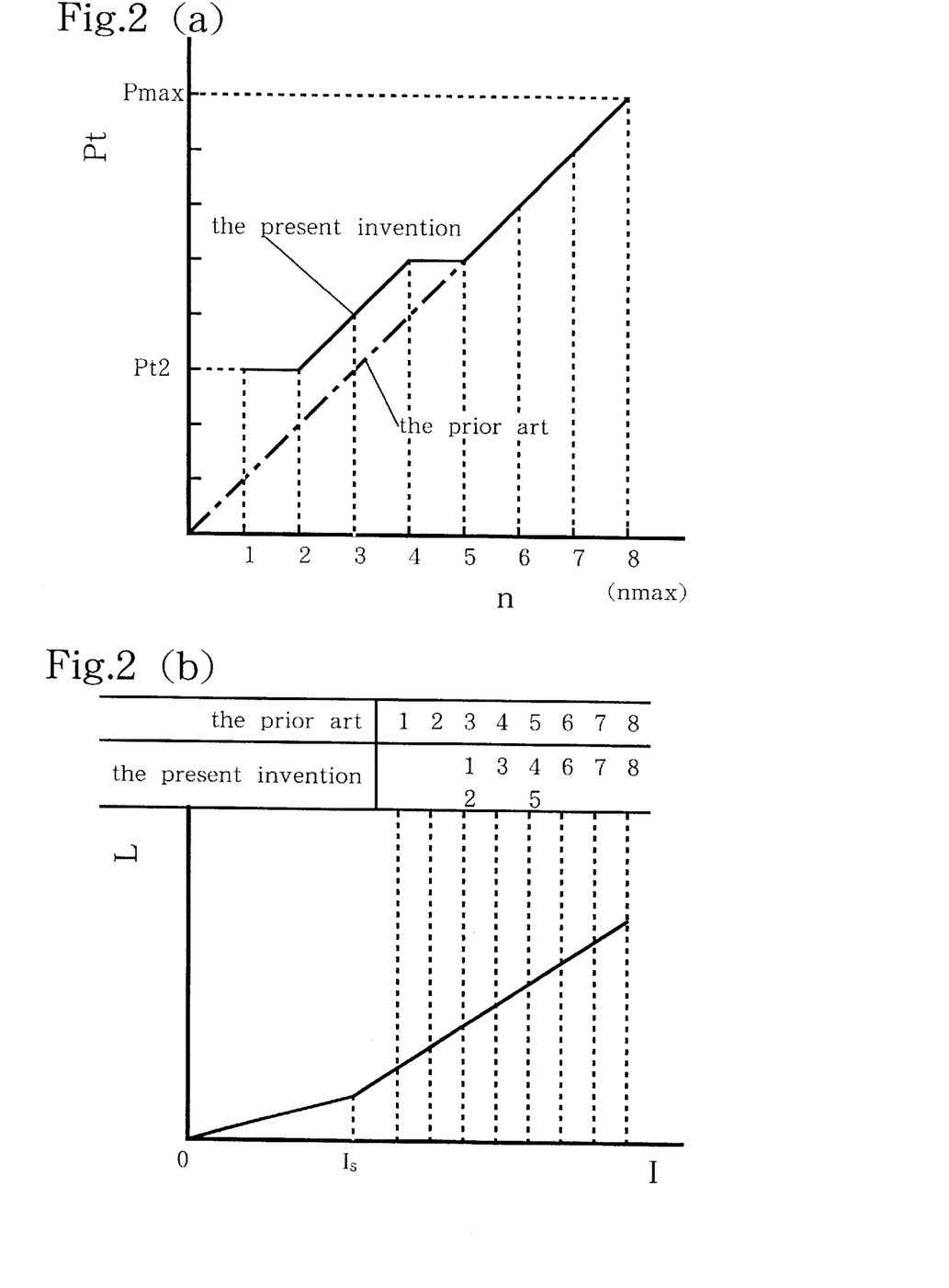

FIG. 2(a) is a graph illustrating the relationship between the number of channels and the total light output power in the first optical amplifier according to the embodiment of the present invention. In this figure, solid lines represent the case of the first optical amplifier which is one embodiment of the present invention while alternate long and short dash lines represent the case of an optical amplifier according to the prior art.

As shown in FIG. 2(a), the first optical amplifier performs its control such that when the number of channels n is maximum or eight, the total light output power $P_t$ becomes equal to the maximum total light output power $P_{max}$. If the number of channels is smaller than the first number of channels of 5 or ranges between 1 and 4, the first optical amplifier performs its control such that the total light output power $P_t$ is substantially $$P_t > P_{max} \times n/8,$$

and if the number of channels is equal to or larger than 5 or the first number of channels, the first optical amplifier performs its control such that the total light output power $P_t$ is substantially $$P_t = P_{max} \times n/8,$$

as in the prior art optical amplifier.

The first optical amplifier further performs its control such that when the number of channels is between 1 and 2 (the second number of channels), the total light output power $P_t$ is maintained substantially at the value of the total light output power $P_{t2}$ on the second number of channels or 2.

For example, if an optical amplifier is a so-called optical fiber amplifier in which an optical fiber added with a rare earth element such as Er or the like is pumped by injecting an pump light thereinto from an pump light source so that the optical fiber can pass and amplify signal lights, the relationship between the injecting current of the pump light source and the light output level can be described as follows.

FIG. 2(b) is an I-L characteristic diagram in which the injecting current I for controlling said pump light source is on horizontal axis while the light output level L from said pump light source is on vertical axis. In this figure, a spontaneous emission light is emitted from the pump light source when the injection current I is between 0 and the laser oscillation threshold current Is. Since the output level at this time is relatively low and thus no laser beam of the necessary wavelength will be obtained, the optical amplifier cannot be controlled. As the injection current I exceeds Is, the laser oscillation begins such that a laser beam having a predetermined wavelength will be outputted from the pump light source with the output level L proportional to the injection current I. Thus, the total light output power $P_t$ of the optical amplifier can be increased or decreased proportional to the amount of injection current I at the pump light source.

Numerals on the top of FIG. 2(b) represent the number of channels corresponding to the controls in both the prior art and the embodiment of the present invention. Each of these numerals corresponds to the value of the injection current I indicated just therebelow.

In other words, the control of the prior art shown in FIG. 2(a) increases both the injection current I and output level L as the number of channels increases from one channel to eight channels, as shown in FIG. 2(b). In the control of the present invention shown in FIG. 2(a), both the injection current I and output level L are substantially the same as those of three channels in the prior art when the number of channels is 1 or 2; as those of four channels in the prior art when the number of channels is three; as those of five channels in the prior art when the number of channels is 4 or 5; and as those of six to eight channels when the number of channels is between six and eight.

The optical amplifier of the prior art shown in FIG. 2(a) controls the total light output power $P_t$ proportional to the number of channels n. In order to utilize the linear sections in the I-L characteristics as effectively as possible, the injection current I corresponding to one or two channels in the prior art was controlled to be very close to the laser oscillation threshold current Is. With one or two channels, therefore, the injection current I becomes too small. Thus, the accurate control cannot be performed, with the amplification in the optical amplifier being destabilized. If the number of channels is changed from two to one, for example, the injection current I may temporarily become lower than the laser oscillation threshold current Is. This may not control the optical amplifier.

On the contrary, this embodiment of the present invention performs its control such that when the number of channels is one or two, the total light output power $P_t$ is maintained constant at the total light output power corresponding to two channels (which is substantially the same as that of three channels in the prior art).

Even though the number of channels is changed between one and two, therefore, it is not necessary to change the injection current I even if it is finely adjusted. Thus, the injection current I can also be maintained as a relatively high level so that the control of the optical amplifier can be stabilized.

If the number of channels n is smaller than eight, the first optical amplifier controls the total light output power such that it is higher than the total light output power proportional to the number of channels. Thus, the contribution of ASE light can be compensated to ensure a good S/N ratio. Even though the gain control of the optical amplifier cannot follow increase or decrease of the number of channels, the gain of the existing channel can be prevented from being made insufficient due to influence of the increase or decrease of channel, since the gain of the existing channel is controlled to be larger than the inherently necessary level.

The first optical amplifier can improve the S/N ratio and reduce the electric power consumed by the optical amplifier on the side of less channels (one to four channels) and will not perform the control with any unnecessarily high gain on the side of more channels (five to eight channels). Thus, the electric power consumed by the optical amplifier can be reduced. Therefore, the control of the optical amplifier can be optimized from the viewpoint of S/N ratio and consumed power.

Moreover, the first optical amplifier can maintain the total light output power $P_t$ substantially constant at the total light output power $P_{t2}$ corresponding to the second number of channels equal to two when the number of channels n is changed from one to two in the second number of channels. Thus, the light output from the pump light source can be stabilized to make the operation of the optical amplifier stable and to improve the reliability.

Figure 3:
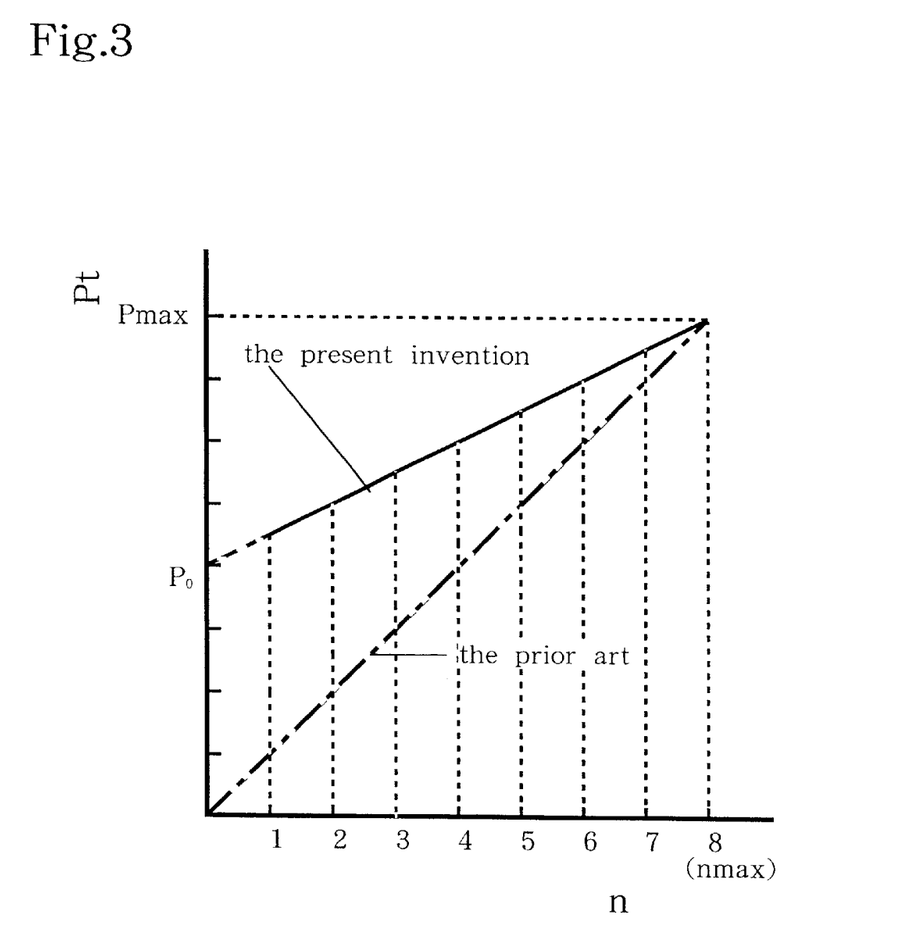
FIG. 3 is a graph schematically illustrating the relationship between the number of channels and total light output power in the second optical amplifier according to the embodiment of the present invention.

FIG. 3 is a graph schematically illustrating the relationship between the number of channels and total light output power in the second optical amplifier according to the embodiment of the present invention. In this figure, solid lines represent the case of the second optical amplifier according to this embodiment of the present invention while alternate long and short dash lines represent the case of the prior art optical amplifier.

As shown in FIG. 3, the second optical amplifier controls the total light output power $P_t$ such that it is substantially $$P_t = P0 + (P_{max} - P0) \times n/8$$

(wherein P0 is a constant value).

If the number of channels n is smaller than eight, the second optical amplifier controls the total light output power such that it becomes higher than the total light output power proportional to the number of channels. Thus, the contribution of ASE light can be compensated to ensure a good S/N ratio. Even though the gain control of the optical amplifier cannot follow increase or decrease in the number of channels, the gain of the existing channel can be prevented from being made insufficient due to influence of the increase or decrease of channel, since the gain of the existing channel is controlled to be larger than the inherently necessary level.

The second optical amplifier can more easily be controlled than the first optical amplifier since the total light output power $P_t$ can be calculated by the same formula without dependent on the number of channels.

Figure 1:
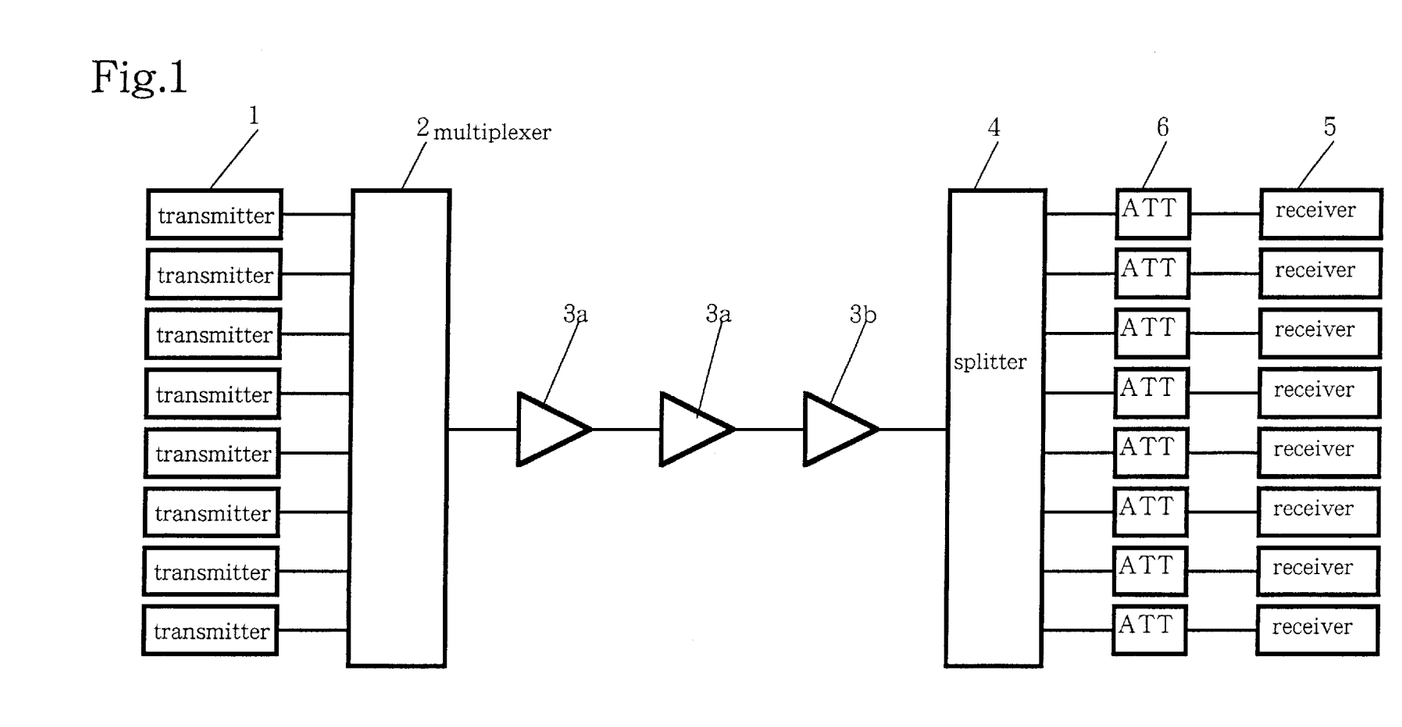
FIG. 1 illustrates a wavelength division multiplex light communication system according to one embodiment of the present invention.

FIG. 1 shows a wavelength division multiplex light communication system according to one embodiment of the present invention. In this figure, parts similar to those of FIG. 9 have similar reference numerals. As can be seen from FIG. 1, this wavelength division multiplex light communication system is characterized by that it comprises the aforementioned optical amplifier 3a or optical amplifiers 3a and 3b.

For example, the optical amplifiers 3a other than the final stage optical amplifier 3b on the light receiver side perform their controls using said first or second optical amplifier. The final stage optical amplifier 3b performs its control such that it provides $$P_t = P_{max} \times n/n_{max}$$

for all the numbers of channels, as in the prior art optical amplifier. In other words, the final stage optical amplifier 3b performs its control with the total light output power so determined that light signals of the respective wavelengths based on the multiplex light signals outputted from the final stage optical amplifier 3b become a level adapted to each of the light receivers 5 for receiving the light signals. In this case, even though each of the light receivers 5 is conventionally available, it can receive light signals without any problem by causing only the final stage optical amplifier 3b to control the gain considering the limit of reception at the light receivers 5, independently of the control of the other optical amplifiers 3a.

In the other form, all the optical amplifiers 3a, 3b may perform the control using said first or second optical amplifier. In such a case, for example, a light attenuator (ATT) 6 may be provided in front of each of the light receivers 5. Such a light attenuator 6 can attenuate and regulate light signals from the respective light receiver. Even if each of the light receivers 5 is conventionally available, therefore, it can receive light signals without any problem.

If the maximum number of channels is changed, moreover, each of the optical amplifiers 3a and 3b can be controlled to reset the total light output power for each number of channels.

Figure 4:
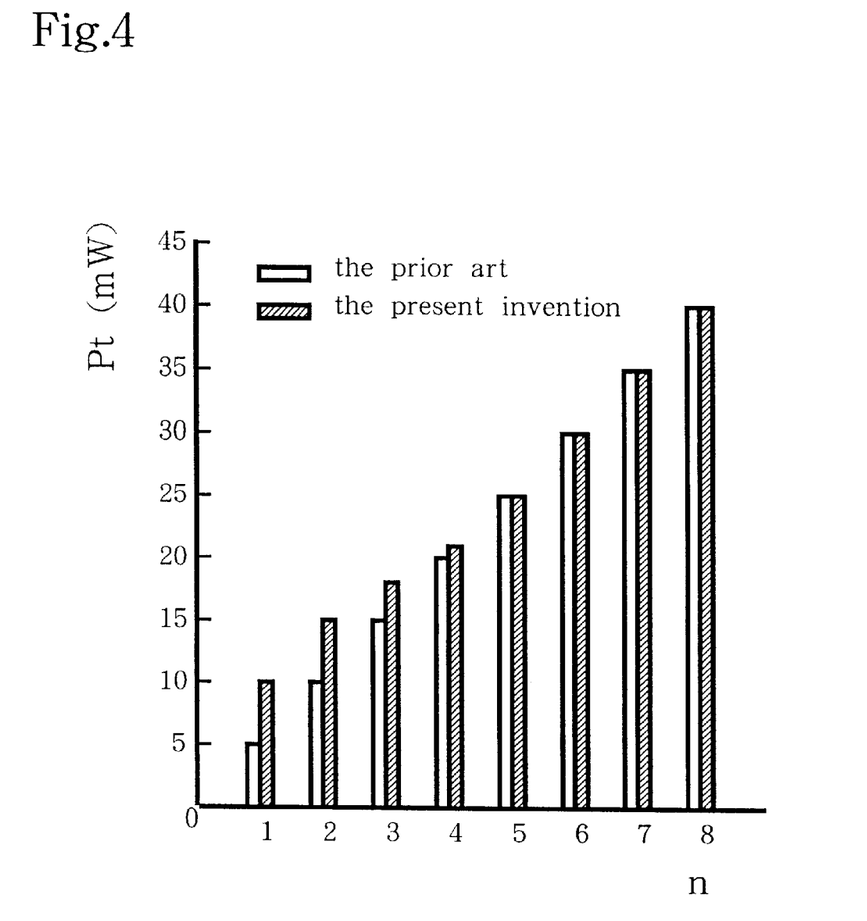
FIG. 4 is a graph illustrating the relationship between the number of channels and the total light output power in an optical amplifier used with a maximum eight-channel wavelength division multiplex light communication system, in comparison with this embodiment with the prior art.
Figure 5:
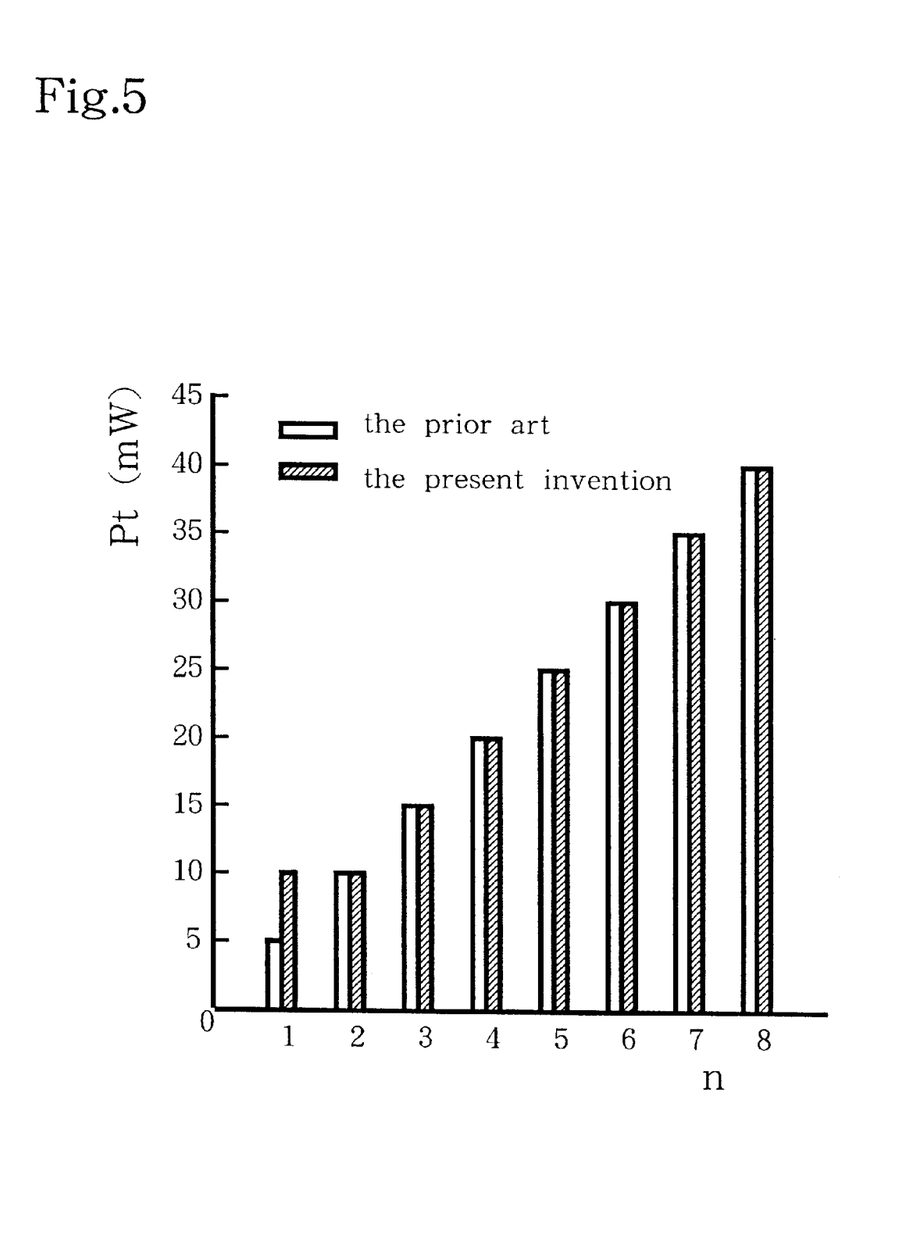
FIG. 5 is a graph illustrating the relationship between the number of channels and the total light output power in another optical amplifier used with a maximum eight-channel wavelength division multiplex light communication system, in comparison with this embodiment with the prior art.
Figure 6:
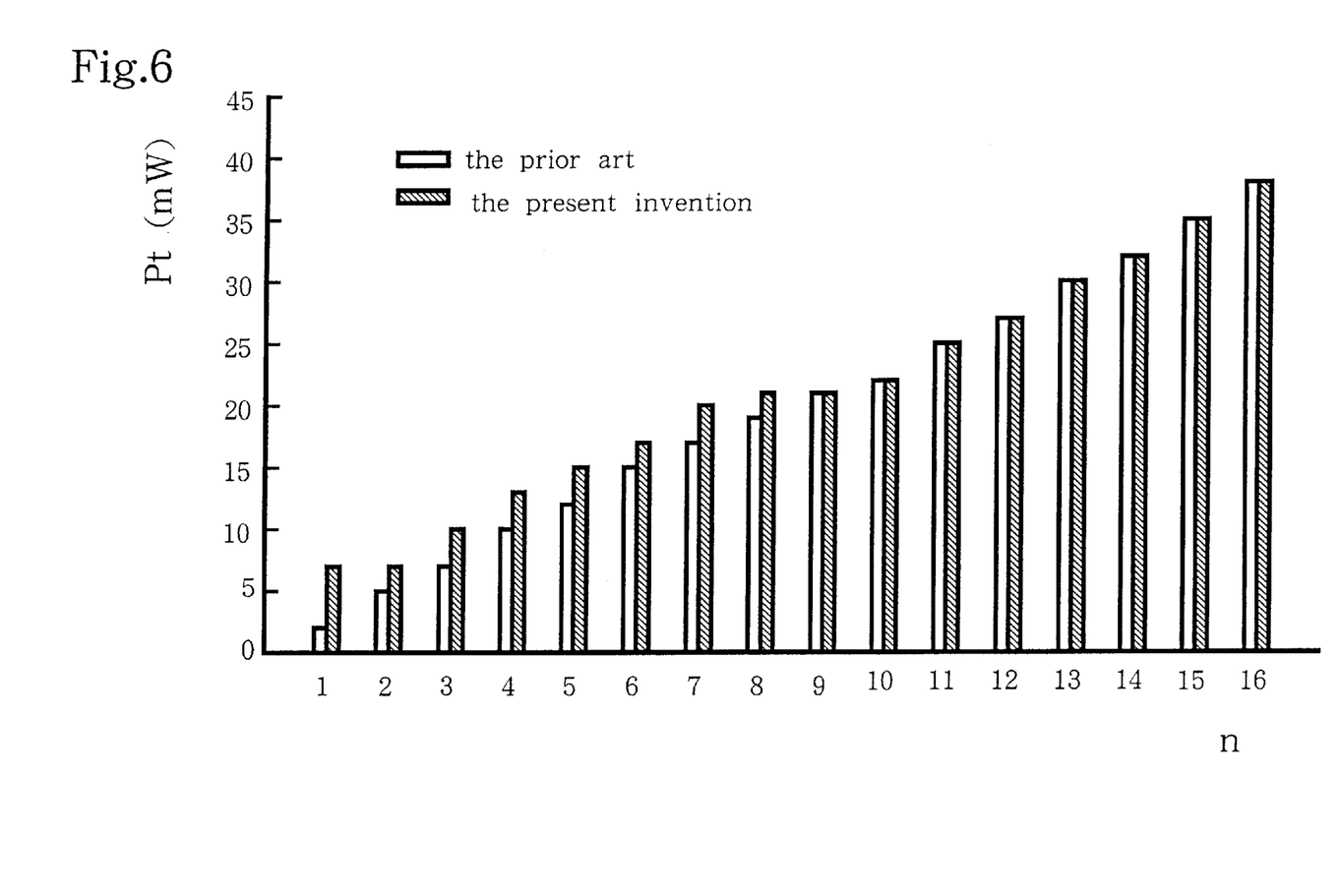
FIG. 6 is a graph illustrating the relationship between the number of channels and the total light output power in an optical amplifier used with a maximum 16-channel wavelength division multiplex light communication system, in comparison with this embodiment with the prior art.

FIGS. 4–6 are graphs illustrating the relationship between the number of channels and the total light output power (or calculated value) in the optical amplifier used with the maximum eight-channel wavelength division multiplex light communication system of the present invention, in comparison with the present invention with the prior art. Conditions of light transmission path include:

(1) Type of optical fiber: single mode;
(2) Bit rate per channel: about 2.4 Gbps; and
(3) One span: 33 dB (which corresponds to about 120 km).

FIG. 4 shows the case of an optical amplifier used in the wavelength division multiplex light communication system having eight channels in maximum. As shown in FIG. 4, this optical amplifier performs its control such that the total light output power for 5–8 channels is substantially the same as that of the conventional optical amplifier and that the total light output power for 1–4 channels is larger than that of the conventional optical amplifier.

FIG. 5 shows the case of another optical amplifier used in the wavelength division multiplex light communication system having eight channels in maximum. As shown in FIG. 5, this optical amplifier performs its control such that the total light output power for 2–8 channels is substantially the same as that of the conventional optical amplifier, and such that the total light output power for one channel is larger than that of the conventional optical amplifier and substantially the same as that of the total light output power for two channels.

FIG. 6 shows the case of an optical amplifier used in the wavelength division multiplex light communication system having sixteen channels in maximum. As shown in FIG. 6, this optical amplifier performs its control such that the total light output power for 9–16 channels is substantially the same as that of the conventional optical amplifier, and such that the total light output power for 1–8 channels is larger than that of the conventional optical amplifier and substantially the same as that of the total light output power for one and two channels.

Figure 7:
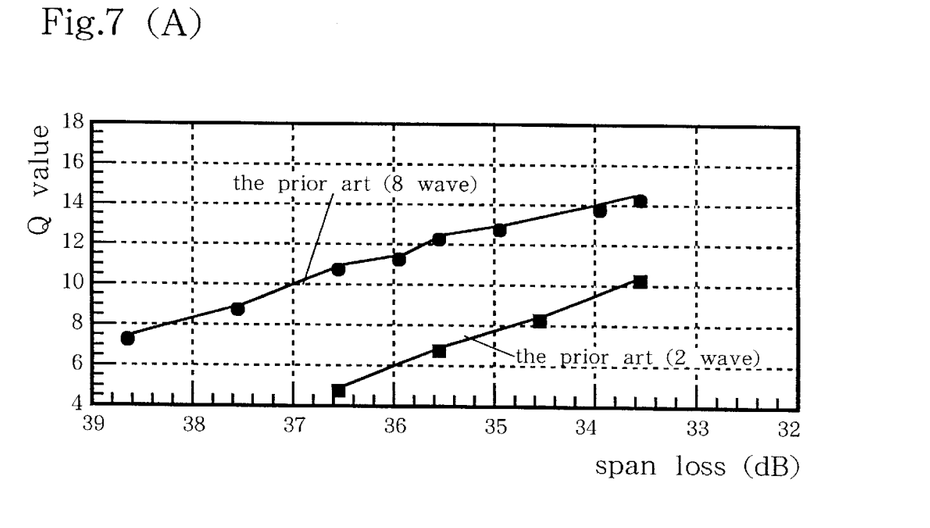
FIG. 7 shows graphs illustrating span loss-Q value (Quality Factor) characteristics of optical amplifiers to be controlled to the total light output power shown in FIG. 4.

FIG. 7 shows graphs illustrating the span loss-Q value (Quality Factor) characteristics of an optical amplifier for controlling the total light output power shown in FIG. 4. FIG. 7(A) is a graph illustrating the span loss-Q value characteristics in the prior art optical amplifier for two-wave (two-channel) and eight-wave (eight-channel) transmissions. FIG. 7(B) is a graph illustrating the span loss-Q value characteristics in the optical amplifier of this embodiment for two-wave and eight-wave transmissions. The measurements were carried out under such a condition in which the number of spans is five; the measuring channel is λ3; and the Q value of the light transmitter output of λ3 is 27.74. In FIG. 7, the horizontal axis represents span loss while the vertical axis represents Q value after five spans have been transmitted.

In comparison between FIGS. 7(A) and 7(B), it is found that, for eight-wave transmission, the embodiment of the present invention has substantially the same characteristics as in the prior art. However, for two-wave transmission, the embodiment of the present invention has an increased Q value to provide a good transmission quality.

Figure 8:
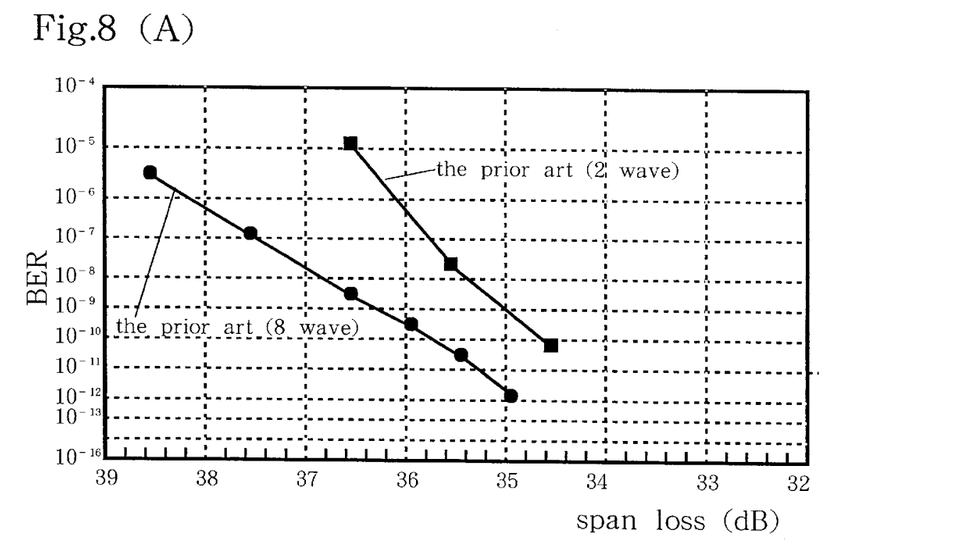
FIG. 8 shows graphs illustrating span loss-BER (Bit Error Rate) characteristics of optical amplifiers to be controlled to the total light output power shown in FIG. 4.

FIG. 8 shows graphs illustrating span loss-BER (Bit Error Rate) characteristics of optical amplifiers to be controlled to the total light output power shown in FIG. 4. FIG. 8(A) is a graph illustrating span loss-BER characteristics in the prior art optical amplifier for two-wave and eight-wave transmissions and FIG. 8(B) is a graph illustrating span loss-BER characteristics in the optical amplifier of this embodiment for two-wave and eight-wave transmissions. The measurements were carried out under such a condition that the number of spans is five; the measurement channel is λ3; and the input power of the light receiver is −15.8 dBm. In FIG. 8, the horizontal axis represent span loss while the vertical axis represents BER.

In comparison between FIGS. 8(A) and 8(B), it is found that, for eight-wave transmission, the embodiment of the present invention has substantially the same characteristics as in the prior art. However, for two-wave transmission, the embodiment of the present invention has a reduced BER to provide a good transmission quality.

The present invention is not limited to the aforementioned embodiments, but may be carried out in any of various other forms without departing from the scope of the invention as defined in the accompanying claims.

For example, if the number of channels n is smaller than $n_{max}$, any optical amplifier other than the aforementioned optical amplifiers may be used when the control is performed such that the total light output power is higher than the total light output power proportional to the number of channels in the conventional optical amplifier.

The optical amplifier of the present invention can compensate the contribution of ASE light and ensure a good S/N ratio since if the number of channels n is smaller than $n_{max}$, the control is carried out such that the total light output power is higher than the total light output power proportional to the number of channels. Even though the gain control of the optical amplifier cannot follow the increase or decrease of channel, the present invention can prevent the gain of the existing channel from being made insufficient due to the influence of channel increase or decrease.

According to the present invention, the S/N ratio can be improved on the side of smaller number of channels to reduce the electric power consumed by the optical amplifier. Since the gain control will not unnecessarily be performed on the side of larger number of channels, the electric power consumed by the optical amplifier can similarly be reduced. In the viewpoint of S/N ratio and consumed power, the control of the optical amplifier can be optimized.

According to the present invention, when the number of channels n is between one and the second number of channels n2 ($n2<n_{max}$), the total light output power $P_t$ is substantially maintained constant at the value of the total light output power $P_{t2}$ for the second number of channels n2. Thus, the light output from the pump light source will be stabilized to make the operation of the optical amplifier stable and to improve the reliability.

The wavelength division multiplex light communication system of the present invention includes the above optical amplifier According to the present invention, even though each of the light receivers is conventionally available, it can receive light signals without any problem since only the final stage optical amplifier is caused to control the gain considering the limit of reception at the light receivers, independently of the control of the other optical amplifiers.

If all the optical amplifiers except the final stage optical amplifier are in the form of the aforementioned optical amplifier, the wavelength division multiplex light communication system of the present invention can perform the maximum function.

What is claimed is:

1. An optical amplifier, for amplifying and translating a multiplex light signal obtained by wavelength division multiplexing a plurality of channel light signals with a total light output power corresponding to the number of light signal channels, wherein the control is performed such that the total light output power Pt becomes equal to the maximum total light output power $P_{max}$ when the number of channels (n) is maximum ($n_{max}$) and also such that the total light output power $P_t$ obtained by amplifying multiplex light signals substantially becomes $$P_t > P_{max} \times n/n_{max}$$

when the number of light signal channels n is smaller than $n_{max}$.

2. The optical amplifier of claim 1, wherein the control is performed such that if the number of channels n is smaller than the first number of channels n1 ($n1<n_{max}$), the total light output power $P_t$ becomes substantially $$P_t > P_{max} \times n/n_{max}, \text{ and}$$

such that if the number of channels n is equal to or larger than the first number of channels n1, the total light output power $P_t$ becomes substantially $$P_t = P_{max} \times n/n_{max}.$$

3. The optical amplifier of claim 1 or 2, wherein the control is performed such that when the number of channels n is between 1 and the second number of channels n2 ($n^2<n_{max}$), the total light output power Pt substantially becomes constant at the total light output power $P_{t2}$ obtained by the second number of channels n2.

4. A wavelength division multiplex light communication system comprising:

a plurality of light transmitters for transmitting light signals;

a multiplexer for wavelength division multiplexing a plurality of channel light signals transmitted from said light transmitters;

a plurality of optical amplifiers connected in series with one another for amplifying and translating the multiplex light signals wavelength division multiplexed by said multiplexer, wherein at least any of said optical amplifiers being any of said optical amplifiers of claim 1 to 3;

a splitter for wavelength separating the light signals amplified by said optical amplifiers for each channel; and a plurality of light receivers for receiving the light signals wavelength separated by said splitter.

5. The wavelength division multiplex light communication system of claim 4, wherein the final stage optical amplifier adjacent to said light receivers may perform its control with a total light output power determined such that the light signal of the respective wavelength outputted from said final stage optical amplifier and wavelength separated by said splitter becomes a level fitting in the light receiver received said light signal.

* * * * *